(12) United States Patent
Roberts et al.

(10) Patent No.: US 12,152,500 B2
(45) Date of Patent: Nov. 26, 2024

(54) COMPOSITE COMPONENT MODIFICATIONS

(71) Applicant: General Electric Company, Schenectady, NY (US)

(72) Inventors: Herbert Chidsey Roberts, Middletown, OH (US); Glenn Curtis Taxacher, Simpsonville, SC (US); Timothy P. Coons, Cincinnati, OH (US); Jared Hogg Weaver, Clifton Park, NY (US); Daniel Gene Dunn, Guilderland, NY (US); Jerome Geoffrey Magnant, Woodbury, MN (US)

(73) Assignee: General Electric Company, Evendale, OH (US)

( * ) Notice: Subject to any disclaimer, the term of this patent is extended or adjusted under 35 U.S.C. 154(b) by 480 days.

(21) Appl. No.: 16/003,627

(22) Filed: Jun. 8, 2018

(65) Prior Publication Data

US 2019/0376389 A1    Dec. 12, 2019

(51) Int. Cl.
*F01D 5/00*    (2006.01)
*C04B 37/00*   (2006.01)
(Continued)

(52) U.S. Cl.
CPC ............ *F01D 5/005* (2013.01); *C04B 37/001* (2013.01); *C04B 41/459* (2013.01); *C04B 41/81* (2013.01);
(Continued)

(58) Field of Classification Search
CPC ... C04B 41/81; C04B 41/459; F05D 2220/32; F05D 2220/80
See application file for complete search history.

(56) References Cited

U.S. PATENT DOCUMENTS 4,240,835 A * 12/1980 Laskow ................ C04B 35/573
                                                  501/88
5,190,611 A *  3/1993 Cologna ............... B29C 73/063
                                                  156/94
(Continued)

FOREIGN PATENT DOCUMENTS

GB        2085769 A   5/1982
JP     H10231174 A    9/1998

*Primary Examiner* — Alex B Efta
(74) *Attorney, Agent, or Firm* — Dority & Manning, P.A.

(57) ABSTRACT

Composite components and methods for adding a composite material to a composite component are provided. For example, a method comprises positioning a composite material segment against the composite component to form a component layup; applying an insulating material around at least a portion of the component layup to form an insulated layup; and densifying the insulated layup, where the composite component was previously densified before positioning the composite material segment against the composite component. In some embodiments, the composite material is ceramic matrix composite (CMC) and the composite material segment is a plurality of CMC plies. The composite component may be a CMC gas turbine engine component that comprises an original CMC component and a new CMC material segment joined to the original CMC component through the transfer of silicon between the original CMC component and the new CMC material segment during melt infiltration.

18 Claims, 5 Drawing Sheets

(51) Int. Cl.
*C04B 41/45* (2006.01)
*C04B 41/81* (2006.01)
*F01D 25/00* (2006.01)

(52) U.S. Cl.
CPC ........ *F01D 25/005* (2013.01); *F05D 2220/32* (2013.01); *F05D 2230/80* (2013.01); *F05D 2240/11* (2013.01); *F05D 2240/12* (2013.01); *F05D 2240/128* (2013.01); *F05D 2240/14* (2013.01); *F05D 2240/30* (2013.01); *F05D 2240/35* (2013.01); *F05D 2300/6033* (2013.01)

(56) References Cited

U.S. PATENT DOCUMENTS

| | | | |
|---|---|---|---|
| 5,336,350 A * | 8/1994 | Singh | C04B 41/4584 428/688 |
| 5,476,684 A * | 12/1995 | Smith | C04B 35/62863 427/419.7 |
| 6,478,922 B1 * | 11/2002 | Rosevear | B29C 70/543 264/319 |
| 6,984,227 B2 | 1/2006 | Morrison et al. | |
| 7,500,833 B2 | 3/2009 | Bublath et al. | |
| 8,141,371 B1 | 3/2012 | Habarou et al. | |
| 8,292,998 B2 | 10/2012 | Laudenklos | |
| 8,403,024 B2 | 3/2013 | Laudenklos | |
| 8,715,435 B2 | 5/2014 | Roberts, III et al. | |
| 9,005,382 B2 | 4/2015 | Steibel et al. | |
| 9,701,072 B2 | 7/2017 | Corman | |
| 10,597,335 B2 | 3/2020 | Dunn et al. | |
| 2002/0058107 A1 * | 5/2002 | Fareed | C04B 35/80 427/255.39 |
| 2003/0196305 A1 * | 10/2003 | Kebbede | C04B 35/653 29/402.09 |
| 2005/0163988 A1 * | 7/2005 | Ebert | C04B 35/573 428/292.1 |
| 2007/0095457 A1 | 5/2007 | Keller et al. | |
| 2007/0128421 A1 | 6/2007 | Lee | |
| 2009/0165924 A1 | 7/2009 | Steibel et al. | |
| 2016/0003103 A1 | 1/2016 | Shapiro et al. | |
| 2016/0097303 A1 | 4/2016 | Baldiga et al. | |
| 2016/0264475 A1 | 9/2016 | Sheedy et al. | |
| 2017/0348926 A1 | 12/2017 | Zhao et al. | |
| 2018/0266766 A1 * | 9/2018 | Chen | F27D 5/0006 |

* cited by examiner

COMPOSITE COMPONENT MODIFICATIONS

FIELD

The present subject matter relates generally to composite components. More particularly, the present subject matter relates to adding new or replacement composite material to a composite component.

BACKGROUND

More commonly, composite components are being used in various applications, such as gas turbine engines. In particular, ceramic matrix composite (CMC) materials are more frequently being used for various high temperature applications. For example, because CMC materials can withstand relatively extreme temperatures, there is particular interest in replacing components within a combustion gas flow path of a gas turbine engine with components made from CMC materials. Typically, CMC materials comprise ceramic fibers embedded in a matrix material such as silicon carbide (SiC), silicon, silica, carbon, alumina, or combinations thereof. Plies of the CMC material may be laid up to form a preform component that may then undergo thermal processing, such as a cure or burn-out to yield a high char residue in the preform, and subsequent chemical processing, such as melt-infiltration with silicon, to arrive at a component formed of a CMC material having a desired chemical composition.

Modifying an existing or original composite component by adding new or replacement composite material to the composite component, e.g., adding new or replacement plies to a melt-infiltrated CMC component, has proven to be difficult. For instance, when new CMC plies are added to an existing melt-infiltrated CMC component and chemically processed to join the new plies to the existing component, the resultant component usually has a greater porosity than is desired. More specifically, processing the new plies and existing component in a high temperature environment causes, e.g., volatilization of silicon from the surface, which leads to porosity in the resultant component. Such porosity can, for example, negatively impact the effectiveness of the bond between the new plies and the existing composite component.

Accordingly, improved composite component modifications would be useful. In particular, methods for modifying composite components that include enclosing an original composite component, with a new composite material segment positioned against the original composite component, within an insulating material during processing to create a desired environment for joining the new material to the original material would be beneficial. Methods that further include applying a coating to the original composite component and the new composite material segment to prevent or reduce bonding of the insulating material to the composites also would be desirable. Additionally, gas turbine engine composite components modified by the addition of new composite material would be advantageous.

BRIEF DESCRIPTION

Aspects and advantages of the invention will be set forth in part in the following description, or may be obvious from the description, or may be learned through practice of the invention.

In one exemplary embodiment of the present subject matter, a method for adding a composite material to a composite component is provided. The method comprises positioning a composite material segment against the composite component to form a component layup; applying an insulating material around at least a portion of the component layup to form an insulated layup; and densifying the insulated layup. The composite component was previously densified before positioning the composite material segment against the composite component.

In another exemplary embodiment of the present subject matter, a method for adding ceramic matrix composite (CMC) plies to a CMC component is provided. The method comprises positioning a plurality of CMC plies against the CMC component to form a component layup; applying a coating to a region of an outer surface of the component layup to form a coated layup; applying an insulating material around at least a portion of the coated layup to form an insulated layup; and densifying the insulated layup. The CMC component was previously densified prior to positioning the plurality of CMC plies against the CMC component.

In a further exemplary embodiment of the present subject matter, a ceramic matrix composite (CMC) gas turbine engine component is provided. The component comprises an original CMC component and a new CMC material segment joined to the original CMC component through the transfer of silicon between the original CMC component and the new CMC material segment during melt infiltration. A source of silicon is applied to the original CMC component during melt infiltration to minimize porosity in the original CMC component through a loss of silicon from the original CMC component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
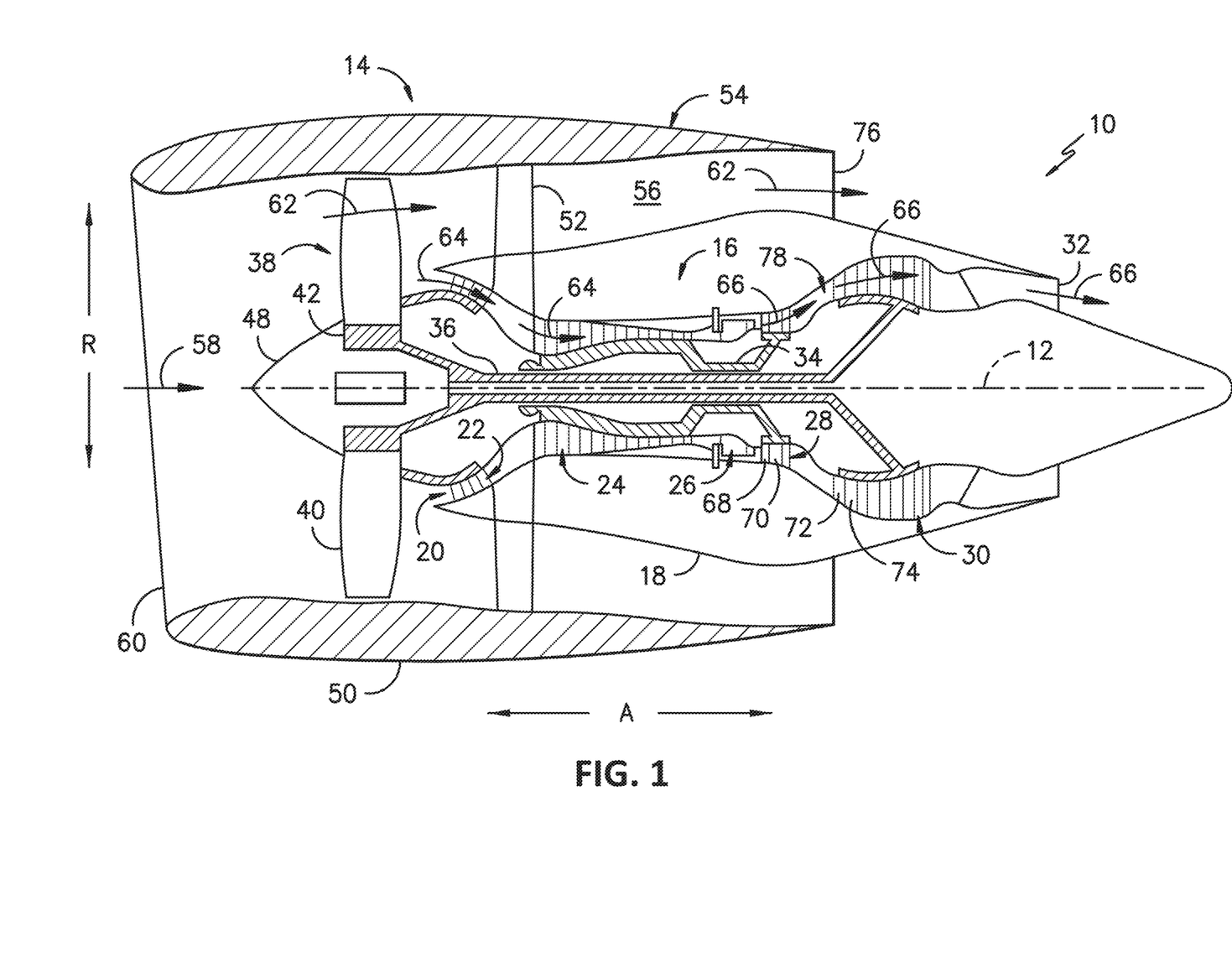
FIG. 1 provides a schematic cross-section view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within or defining the hot gas path 78, may comprise a composite material, such as a ceramic matrix composite (CMC) material having high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, carbon, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), carbon (e.g., Toray's T300, and Hexcel's AS4), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a woven carbon fiber cloth rather than as a tape.

As stated, components comprising a composite material may be used within the hot gas path 78, such as within the combustion and/or turbine sections of engine 10. As an example, one or more stages of turbine rotor blades and/or turbine nozzles may be CMC components formed from CMC materials. However, composite components including components made from other composite materials, such as polymer matrix composite (PMC) components, may be used in other sections as well, e.g., the compressor and/or fan sections.

One or more composite components may experience localized damage during the life of the component or new composite material may need to be added to an existing composite component (i.e., after the composite component has been completely processed). For example, a CMC turbine blade may be damaged in service if a tip or cap of the blade comes into contact with a gas turbine shroud. The CMC component also could be damaged by foreign objects, e.g., a foreign object impinging one or more components of the hot gas path. Further, initial damage to a CMC component may lead to secondary damage if the CMC or ceramic fibers are exposed to oxygen, moisture, or contaminates, e.g., water vapor in the combustion gases 66 within the hot gas path 78 can cause recession of the CMC.

Figure 2:
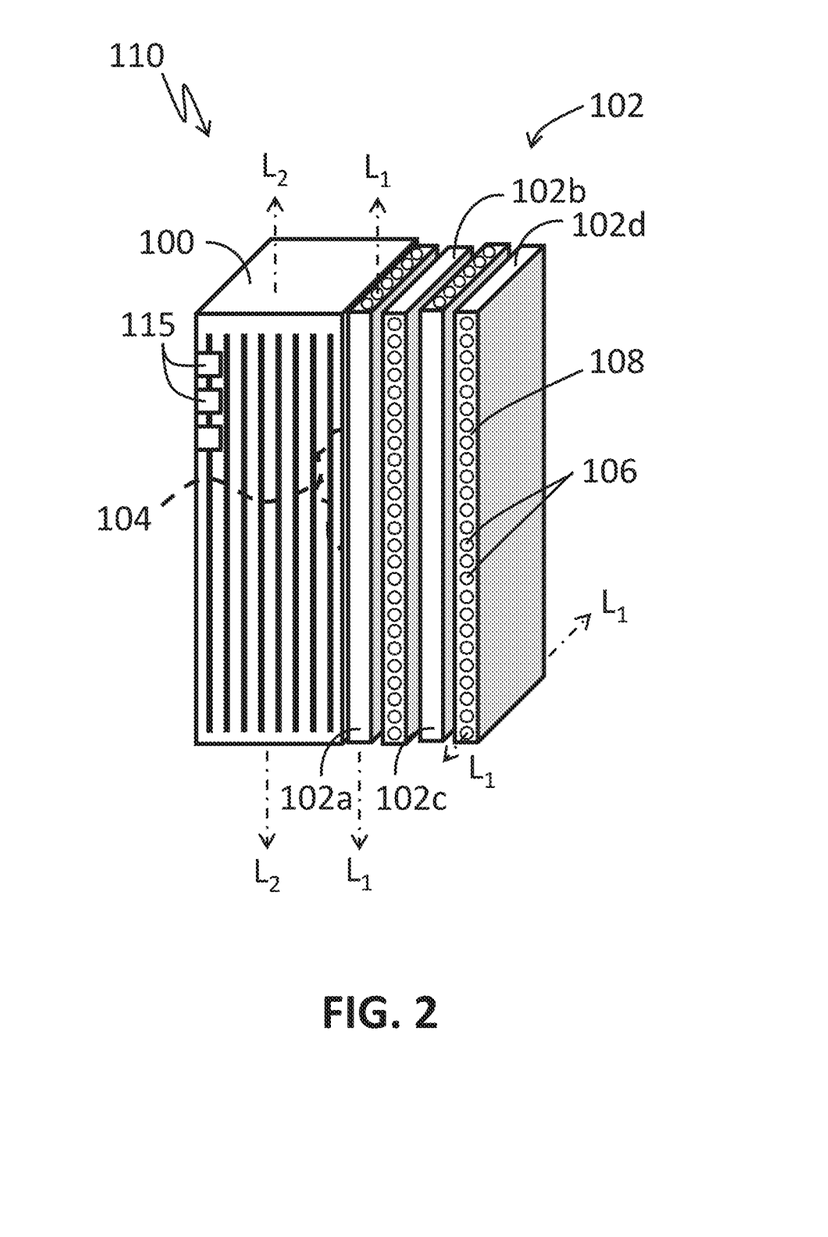
FIG. 2 provides a schematic cross-section view of a component layup that includes an original composite component and a new composite material segment formed from a plurality of new composite material plies, according to an exemplary embodiment of the present subject matter.

Turning to FIG. 2, a schematic cross-section is provided of an existing composite component 100 having new composite material 102 that is to be added to the component 100 positioned against the component 100. The composite component 100 has been fully formed, i.e., thermally and chemically processed as described in greater detail herein. The new composite material 102 is a composite material segment that comprises at least one ply or a preform that is formed from a composite material. In the depicted embodiment, the new composite material 102 comprises a plurality of plies 102a, 102b, 102c, 102d that are formed from a composite material. For instance, in exemplary embodiments, the composite component 100 is a CMC component, and the plurality of plies 102 are CMC plies formed as a tape as previously described.

In some embodiments, the composite material plies 102 are added to the composite component 100 to repair the component 100. In such embodiments, the composite material plies 102 are positioned on or against the composite component 100 at a damaged area 104. The damaged area 104 may be, e.g., a cavity resulting from impingement by a foreign object during use of the component 100, inadvertent contact during use between the composite component 100 and an adjacent component, or any other source of damage to the component 100. As used herein, the term "cavity" refers to any hollow space within the composite component 100, such as an opening, crack, gap, aperture, hole, etc. Such a cavity or damaged area 104 can be formed on or in the composite component 100 through normal use and generally represents an area where fragments of the original composite material have been chipped off of the composite component 100.

To repair the damaged area 104, the damaged area first may be scarfed, e.g., to clean matrix material and fibers from the damaged area and/or to otherwise prepare the area to receive repair or new composite material 102. In some embodiments, the damaged area is scarfed by machining about the damaged area 104 at a specific angle or to achieve a target aspect ratio, such as a width to depth ratio of 4:1, for the damaged area. In other embodiments, the damaged area 104 is scarfed by removing ceramic fibers protruding from or into the cavity and/or by removing loose matrix material from the cavity, but otherwise not enlarging the damaged area. In appropriate embodiments, the damaged area 104 may not require scarfing, such that scarfing is omitted or skipped.

After preparing the damaged area 104, the new composite material segment 102 is positioned against the composite component 100 at the damaged area 104. However, the composite material segment 102 need not be added to the composite component 100 only at damaged areas 104, e.g., the new material 102 may be added to define a feature of the composite component 100, to reinforce an area of the composite component 100, etc. Thus, the new composite material segment 102 is positioned against the composite component 100 anywhere new material is needed or desired.

As further illustrated in FIG. 2, the composite material plies 102 (i.e., the new composite material 102) are laid up with the composite component 100 such that the orientation of a portion of the plies 102 varies with respect to the other plies 102 and the component 100. More particularly, each ply includes a plurality of fibers 106 embedded in a matrix material 108, as discussed. In exemplary embodiments, the fibers 106 in each ply are continuous fibers that extend generally along a longitudinal direction $L_1$ defined by the ply 102. Further, neighboring plies 102 may have any suitable orientation relative to one another and the component 100. For example, FIG. 2 illustrates plies 102 having a 0°/90° orientation relative to a longitudinal direction $L_2$ defined by the composite component 100. That is, a first portion of the composite plies 102 are oriented such that the fibers 106 within the first portion are generally parallel to the longitudinal direction $L_2$, and a second portion of the composite plies 102 are oriented such that the fibers 106 within the second portion are generally perpendicular to the longitudinal direction $L_2$. Additionally, the orientation of the plies 102 alternates from a 0° orientation to a 90° orientation such that every other ply 102 is oriented 0° with respect to the longitudinal direction $L_2$ and the remaining plies 102 are oriented 90° with respect to the longitudinal direction $L_2$. Thus, in the embodiment depicted in FIG. 2, a first composite material ply 102a of the plurality of composite material plies 102 is positioned on or against the composite component 100 and the remainder of the plurality of composite material plies 102 are stacked on top of or against the first composite material ply 102a, with the orientation varying between neighboring plies 102. More specifically, the plies 102a and 102c have the same orientation and plies 102b and 102d have the same orientation, with the orientation of plies 102b and 102d different from the orientation of plies 102a and 102c with respect to the composite component 100. Either plies 102a and 102c or plies 102b and 102d may have a 0° orientation while the other two plies have a 90° orientation with respect to the longitudinal direction $L_2$.

In other embodiments, the stack of plies 102 laid up against the composite component 100 may have a −45°/45° orientation relative to the longitudinal direction $L_2$, such that the first portion of plies 102 are oriented −45° with respect to the longitudinal direction $L_2$ and the second portion of plies 102 are oriented 45° with respect to the longitudinal direction $L_2$, with the layup of plies 102 alternating between the first portion and the second portion. In still other embodiments, the plies 102 may be arranged in a 0°/90°/45°/−45° orientation relative to the longitudinal direction $L_2$, i.e., a first ply 102 is oriented 0°, a second ply is oriented 90°, a third ply is oriented 45°, and a fourth ply is oriented −45° relative to the longitudinal direction $L_2$, with this orientation pattern repeated throughout the stack of plies 102 laid up against the composite component 100. In yet other embodiments, the plies 102 may have any other suitable orientation relative to each other and a reference axis or direction.

It should be noted that, while continuous fibers 106 are preferably utilized for the composite material plies 102, the plies 102 are not limited to continuous fibers. Any suitable fibers, including continuous fibers or discontinuous fibers having any suitable specified or random orientations within a ply, are within the scope and spirit of the present subject matter. Woven plies are also within the scope and spirit of the present subject matter.

Figure 3:
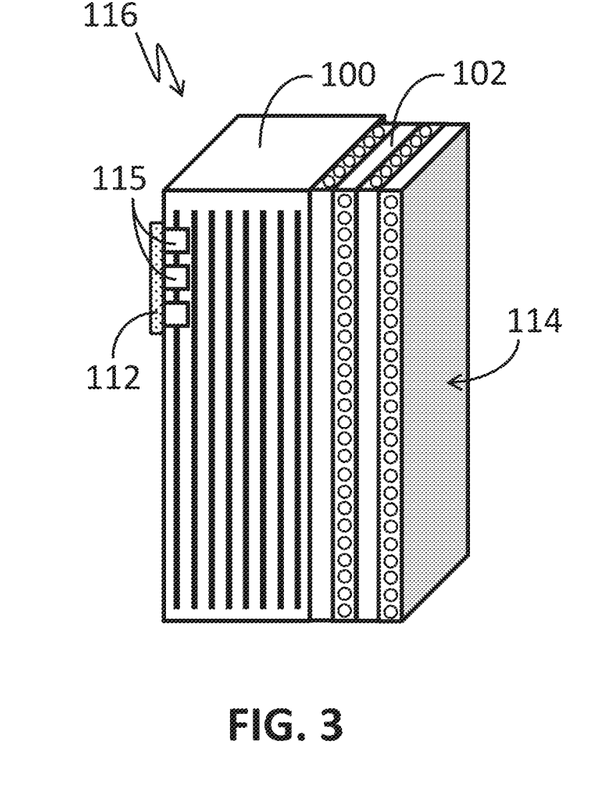
FIG. 3 provides a schematic cross-section view of the component layup of FIG. 2 to which a coating has been applied to form a coated layup, according to an exemplary embodiment of the present subject matter.
Figure 4:
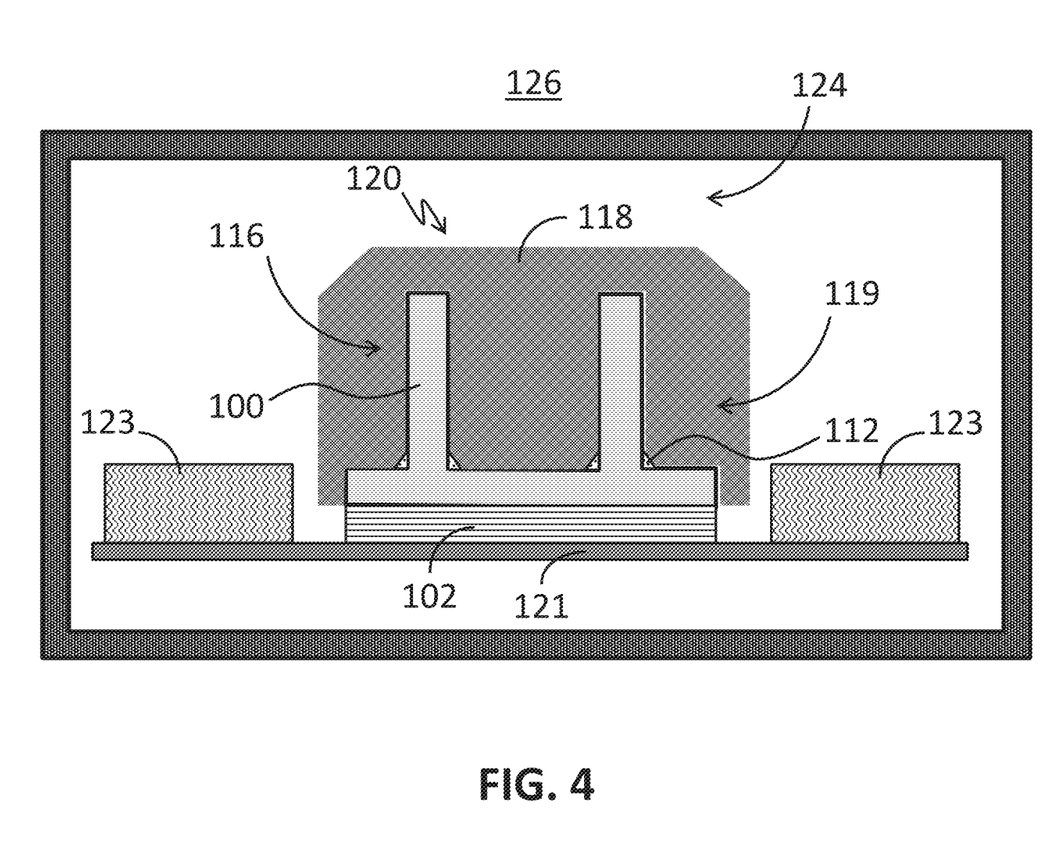
FIG. 4 provides a schematic cross-section view of the coated layup of FIG. 3 with an insulating material applied around the composite component portion of the coated layup to form an insulated layup, according to an exemplary embodiment of the present subject matter.
Figure 5:
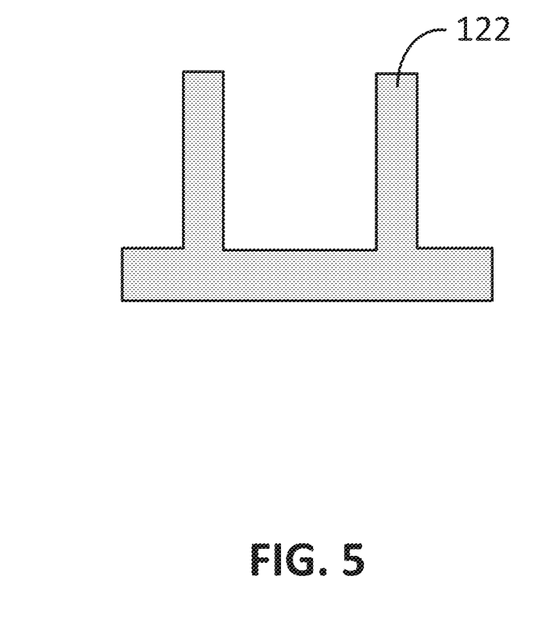
FIG. 5 provides a schematic cross-section view of a gas turbine engine component, such as a component of the gas turbine engine of FIG. 1, following processing of the insulated layup of FIG. 4, according to an exemplary embodiment of the present subject matter.

After the new composite material 102, i.e., the composite material segment that may be a stack of composite plies or a composite preform or the like, is positioned on or against the existing composite component 100, the assembly may be referred to as a component layup 110. Turning to FIGS. 3 and 4, before the component layup 110 is processed to join, bond, or otherwise couple the new composite material segment 102 to the composite component 100, the component layup 110 a coating may be applied to a portion or region 115 of the layup 110 and an insulating material applied around at least a portion of the layup 110 to help create an environment during subsequent processing that limits the porosity of the final component. Referring to the schematic illustration of FIG. 3, a coating 112 is applied to a portion of an outer surface 114 of the component layup 110 to form a coated layup 116. Then, as shown in the schematic representation of FIG. 4, an insulating material 118 is applied or packed around the original composite component 100 portion of the coated layup 116 to form an insulated layup 120. The insulating material 118 also may be referred to as insulating pack 118, or in specific embodiments in which a main or major constituent of the insulating material 118 is silicon as further described herein, the insulating material may be referred to as silicon pack 118. The insulated layup 120 is processed, e.g., by firing and densifying the insulated layup 120, to form a new composite component 122, as depicted in FIG. 5. As illustrated in FIGS. 4 and 5, in one exemplary embodiment, the new composite component 122 may be a shroud of a gas turbine engine.

The coating 112 is applied to the component layup 110 to limit bonding of the insulating material 118, or a liquid infiltrating material (for densifying the structure formed by the original and new composite material as further described herein) or constituents of the insulating material 118, to the region(s) 115 of the composite structure to which the coating 112 is applied. More particularly, to help impede or prevent the insulating material 118 during densification from attaching to regions 115 of the component layup 110 that are sensitive to buildup of constituents of the insulating material 118 such as silicon, the coating 112 is applied to the sensitive regions 115. The sensitive regions 115 may be one or more machined features (e.g., cooling holes, attachment or mounting holes, slots, and/or sealing surfaces), features having critical dimensions (e.g., machined features having small tolerances), or areas where it would be difficult to remove buildup of unwanted material (e.g., unwanted or accumulated silicon or the like). In this way, the coating 112 may be considered an outer surface pre-treatment. It will be appreciated that the coating 112 is selectively applied over the outer surface 114 of the component layup 110, and one or more portions of the outer surface 114 may remain uncoated or untreated with the coating 112. In some embodiments, the coating 112 is not required or may be omitted, and therefore, no coating 112 is applied to the outer surface 114 prior to applying the insulating material 118 around the component layup 110 as described in greater detail below. In exemplary embodiments, the coating 112 is a non-organic parting agent capable of withstanding a temperature of at least 1000° C., e.g., a temperature within a range of about 1000° C. to about 1600° C., such as boron nitride (BN) or a similar parting agent that limits the bonding of the insulating material 118 and/or the constituents of the insulating material 118 to the portion of the component layup 110 to which the coating 112 is applied.

The insulating material 118 is applied or packed around one or more portions 119 of the coated layup 116 or uncoated component layup 110 to provide a desired environment 124 during densification of the component 100 and composite material segment 102. That is, the insulating material 118 forms a pack around the portion(s) 119 and has a composition such that, when heated during densification, a locally high vapor pressure is built up at or near the portion(s) 119 with a gas that is substantially devoid of gases that encourage porosity in composite material components.

For instance, in embodiments in which the composite material of the composite component 100 and composite material segment 102 is CMC, the insulating material 118 preferably is a silicon-based (Si-based) slurry composition that forms a shell-like enclosure around the original component 100, and a locally high silicon vapor pressure is built up during densification from the insulating material 118, i.e., the silicon source, that is outside of but in close proximity to the outer surface 114 of the original component 100. As such, the insulating material 118 impedes or prevents porosity-encouraging gases, such as oxygen, from building up within the densification environment 124 and facilitates a higher vapor pressure of constituents such as silicon in the region of the insulating material pack to encourage silicon infiltration of porosity in the composite material proximal to the insulating material 118. That is, in exemplary embodiments, the insulating material 118 creates a non-oxidizing densification environment 124 with a locally high silicon vapor pressure.

In an exemplary embodiment, the original composite component 100 is a CMC component and the new composite material segment 102 is a CMC segment. The CMC of each part 100, 102 may include silicon or a silicon alloy, and also may contain silicon carbide. Examples of insulating materials 118 that may be used for forming an insulating pack around such a CMC include silicon, boron nitride, silicon carbide, silicon nitride, boron carbide, boron, carbon (e.g., carbon powder, carbon fiber, and carbon felt) and combinations thereof. For instance, to create a relatively high local silicon vapor pressure, the insulating material 118 may comprise, by dry weight, 25-95% silicon, 0-10% boron carbide, 0-50% boron nitride, and 0-20% organic binder, with water added as necessary to achieve desired flow characteristics of the insulating material 118. In an embodiment, the insulating material 118 comprises, by dry weight, 80% silicon, no (0%) boron carbide, 10% boron nitride, and 10% organic binder, with water added to achieve a desired consistency or flow of the insulating material 118.

Various methods known to skilled artisans may be employed to deposit the insulating material 118 around the coated CMC layup 116 or uncoated component layup 110, preferably around the original component 100 portion of the layup 110 or layup 116. Any method suitable for depositing a material with sufficient compatibility, in view of the composition of the CMC parts 100, 102, may be adopted for such use. The insulating material 118 enclosure is formed to keep silicon in the CMC during refurbishing, repair, restructuring, and the like, which may include subsequent melt infiltration (MI). When an MI step is performed to restructure, repair, rebuild, densify, strengthen, enlarge, or otherwise modify a CMC component, such as a CMC component that was itself formed by an MI process, a temperature above the melting point of silicon may be applied. Conventionally, if residual silicon present in the CMC component has access to an ambient or furnace environment 124 during such heating, it may evaporate and be lost from the CMC component, resulting in gaps, voids, pockets, fissures, or other porosity in the CMC component. Applying the insulating material 118 around portion(s) 119 of the component layup 110 or coated layup 116, in accordance with the present invention, separates silicon within the layup 110 or 116 from the ambient environment 124, such as during an MI process. Under such circumstances, although the CMC parts 100, 102 may be exposed to a temperature above, for example, a melting point of silicon, loss of silicon from the CMC component 100 and segment 102 and formation of porosity therein is reduced, minimized, or eliminated, because the insulating material 118 prevents or impedes access of volatized silicon, and subsequent loss, to the ambient environment 124. In one embodiment the insulating material 118 can cover at least part of the new composite material 102. In one embodiment the insulating material 118 can enclose the entire CMC layup 110 or the entire CMC layup 116.

Conventional methods known to those skilled in the art may be used to apply or deposit the insulating material 118 about one or more portions 119 of the layup 110 or layup 116. Such conventional methods may generally include, but should not be limited to, plasma spraying; high velocity plasma spraying; low pressure plasma spraying; solution plasma spraying; suspension plasma spraying; high velocity oxygen flame (HVOF); electron beam physical vapor deposition (EBPVD); sol-gel; sputtering; slurry processes such as dipping, spraying, tape-casting, rolling, plastering, painting, and applying a putty-like paste; and combinations of these methods. In an exemplary embodiment, the insulating material 118 may be deposited by a slurry process, e.g., dipping, spraying, tape-casting, rolling, or painting. In another exemplary embodiment, to help control the amount of insulating material 118 deposited as well as the thickness of the insulating material, the insulating material 118 can be deposited as a shear thinning paste using vibratory molds or tooling. For instance, the layup 110 or layup 116 is placed in a mold on a vibration table, and the insulating material 118, configured as a shear thinning paste, is applied to one or more portions 119 of the layup 110 or 116, with the mold vibrating to thin the paste insulating material 118 to a desired thickness over each portion 119. In another exemplary embodiment, carbon felt is impregnated with silicon and boron nitride powders and the felt is cut into pieces that are stacked together to create the insulating material 118. It will be appreciated that the impregnated carbon felt insulating material 118 may be easier to handle or manipulate than an insulating material 118 in another form, e.g., a slurry insulating material.

The insulating material 118 facilitates creating a structurally significant bond between the original composite component 100 and new composite material segment 102. In addition to isolating the component 100 from porosity-encouraging atmosphere, the insulating material 118 prevents or impedes migration of material from the original component 100 to the new material segment 102, which could create or enlarge pores in the original component 100, as the bond between the existing component 100 and the new material segment 102 is generated. More specifically, additional composite material 102 may be added to the original composite component 100, such as for refurbishment, repair, or other modification that includes addition of additional structure to the component 100. In exemplary embodiments, the original composite component 100 and new composite material 102 are formed from a CMC, and the formation of the additional material 102 may be achieved by any of a variety of methods known to skilled artisans, such as processes known as a "prepreg" process and another known as a "slurry cast" process. Processes may differ in how a green composite preform of the new material segment 102 is formed, but in different embodiments, a final densification step may involve silicon melt infiltration (MI) into the green composite preform for the added CMC segment 102. That is, once a green composite preform containing the fibers and matrix constituents is formed, it is heated while in contact with a source of silicon metal or alloy that produces a ceramic matrix when reacting with the matrix constituents. In some embodiments, as illustrated in FIG. 4, a wick 121 may be attached to the new composite material segment 102, and the external source of silicon 123 for producing the ceramic matrix in the new material is positioned in contact with the wick 121 rather than in contact with the new material segment 102; the wick 121 may allow better control of the infiltration of the new material segment 102 compared to direct contact between the external silicon 123 and the segment 102. The molten infiltrating silicon readily wets the matrix constituents (e.g., SiC and/or carbon matrix constituents) of the green composite preform and, therefore, is easily pulled into a portion of the porosity of the preform by capillary action. No external driving force is typically needed for the infiltration of silicon into the matrix constituents, and there is typically no dimensional change of the composite preform as a result of the infiltration (as the porosity of the preform is filled with silicon). Current conventional processes for melt infiltration of fiber-reinforced CMCs using silicon (e.g., silicon metal or alloy) utilize batch processes where either silicon metal powder is applied onto the surface of the preform or silicon is transferred to the preform in the molten state using a porous carbon wick.

Conventionally, performing such steps may result in loss of silicon from the original CMC component 100. For example, a relatively high equilibrium silicon vapor pressure and a constant vacuum source during MI lead to silicon volatilization from the surface of the original CMC component 100. Further, silicon from the original CMC component 100 may be lost to, or may migrate to, the new CMC material 102 during MI. In accordance with the present subject matter, applying or packing the insulating material 118 around the original CMC component 100 prevents or reduces such loss and resultant formation of porosity or enlarged pore size within the original CMC component 100, as well as prevents or reduces undesirable porosity in the new material 102. More particularly, applying the insulating material 118 away from the new material 102, i.e., applying the insulating material 118 around the original component 100, insulates the original material such that its temperature lags compared to the temperature of the new material as the parts 100, 102 are heated. Thus, the insulated original component 100 is above the melting point of silicon for less time than the new material 102, resulting in a lower probability of silicon loss from the original component 100 to the new material 102. Exemplary insulating materials 118 for insulating the original component 100 to produce such a temperature lag are low emissivity, high porosity materials. In one embodiment, the insulating material 118 is a boron nitride coated carbon felt. Accordingly, silicon does not have to be a constituent of the insulating material 118 for the temperature lag benefit, but silicon does have a high heat of fusion and energy absorption, which make it attractive for such a purpose. Further, when applied for thermal insulation, the insulating material 118 may have a thickness of at least five millimeters (5 mm). In one exemplary embodiment, the thickness of the thermal insulating material 118 is within a range of about 5 mm to about 100 mm and, more particularly, within a range of about 10 mm to about 50 mm. Any appropriate thickness of the insulating material 118 may be chosen to provide the desired thermal insulation.

Additionally, applying the insulating material 118 around the original CMC component 100 produces a high silicon vapor pressure at the outer surface 114 of the component 100 during MI. More specifically, by providing a source of silicon in intimate contact or close proximity to the outer surface 114 of the original CMC component 100, silicon volatilization into the atmosphere from the component 100 is reduced because the silicon source provides the silicon required to maintain the relatively high equilibrium silicon vapor pressure. Thus, choosing an insulating material 118 that includes silicon as a constituent and applying the insulating material 118 in contact with or close proximity to the original CMC component 100 prevents or impedes the formation or enlargement of porosity in the component 100 by maintaining the silicon vapor pressure at the component 100. When applied for creating or maintaining a relatively high local silicon vapor pressure, the insulating material 118 may have a thickness of at least one-half millimeter (0.5 mm). In one exemplary embodiment, the thickness of the thermal insulating material 118 is within a range of about 0.5 mm to about 35 mm and, more particularly, within a range of about 2 mm to about 15 mm. Any appropriate thickness of the insulating material 118 may be chosen to provide the desired silicon vapor pressure.

Further, a silicon source, i.e., insulating material 118, in intimate contact or close proximity to the outer surface 114 of the original CMC component 100 may act as a feed source of silicon to fill any pores that otherwise would have opened up during the modification process. That is, the new CMC material segment 102, as well as the atmosphere about the new segment 102 and the original component 100, can suck or draw silicon away from the original material during the densification portion of modifying the original component 100 by adding new material 102. Without a source of new silicon for the original component 100, voids may form in the original component 100 because its silicon is drawn away. However, if there is a source of new silicon, i.e., insulating material 118, for the original component 100, the new silicon can be drawn into the original material, which reduces the likelihood of void formation. Moreover, the insulating material 118 impedes reaction with oxygen containing species in the MI environment, which can also contribute to porosity in the final CMC component 122. In addition, in some embodiments the insulating material 118 may be applied around the entire uncoated layup 110 or coated layup 116, although the insulating material 118 need only be applied to the original component 100 to achieve the benefits described above.

Upon infiltration of molten silicon, such as via capillary action during the silicon infiltration processes discussed above, the silicon is drawn into the matrix constituents of the CMC layup 120 and may react with carbon thereof to form a SiC-based CMC component 122 with a matrix portion including a substantially SiC crystalline structure about the fibers (e.g., SiC fibers). In addition to forming a ceramic SiC crystalline structure of a matrix portion, the silicon infiltration process fills at least some of the remaining porosity of the matrix portion with silicon metal or alloy that does not react with carbon of the constituents. In this way, interconnected pockets of "free" or un-reacted elemental silicon may be formed within the matrix portion. Accordingly, a matrix portion of an exemplary SiC-based CMC component 122 may be a substantially Si—SiC matrix portion. In some embodiments, infiltrated "free" silicon in such matrix portion (i.e., Si that does not form SiC) may be about 2 vol % to about 50 vol % of a matrix portion, and more preferably about 5 vol % to about 35 vol % of a matrix portion, and even more preferably about 7 vol % to about 20 vol % of a matrix portion.

Silicon may be disposed on the matrix portion of the new CMC material segment 102, which is formed on or against the original CMC component 100 as described herein, then exposed to a temperature above the melting point of silicon, forming molten silicon. Molten silicon is then allowed to disperse into the matrix portion of the added CMC segment 102. In another embodiment, silicon may be contacted to a wick then exposed to a temperature above the melting point of silicon to form molten silicon, which, by capillary action, may be drawn into the matrix portion of the newly added CMC segment 102, itself formed on or against the original CMC component 100. Molten silicon may be formed by exposing silicon 123 on the newly formed matrix portion, the CMC segment 102, or wick 121 contacting the silicon 123 to such segment, to a temperature of between 1300° C. and 1600° C. For example, a temperature of between 1380° C. and 1500° C. may be attained. Temperatures outside these ranges may also be used. When it is no longer desirable or needed for silicon to remain in a molten form, the temperature may be lowered to a temperature below the melting point of silicon to permit it to solidify, such as distributed among and within matrix components of the newly formed CMC component 122.

Further, because the new CMC material segment 102 is positioned on or against the original CMC component 100, some wicking of silicon from the original CMC component 100 into the newly formed CMC material segment 102 occurs, which helps form a structurally significant bond between the original CMC component 100 and the new CMC material segment 102. As previously described, densifying the insulated layup 120 with the insulating material 118 applied or packed around the original component 100 helps control the environment 124 about the original component 100. The environment 124 created by the insulating material 118 prevents, minimizes, or reduces the overall loss of silicon from the original CMC component 100 due to volatization during subsequent processing, such as during melt infiltration (MI) processing, as well as prevents, minimizes, or reduces the formation of porosity within the new CMC component 122. For example, the insulating material 118 may be configured to create a locally high silicon vapor pressure at or near the original component 100. In some embodiments, the insulating material 118 may be configured such that the layup 120 is heated in a non-oxidizing environment 124 (i.e., the residual gases within the environment 124 have no significantly deleterious effect on the infiltrating silicon). In other embodiments, the insulating material 118 may be configured to heat the layup 120 in an inert gas environment 124. In some embodiments, controlling the environment 124 about the insulated layup 120 while the layup 120 is heated may include heating the layup 120 in a vacuum furnace. In still other embodiments, the furnace may be configured to heat the layup 120 in a vacuum to substantially remove gas that is trapped or formed within the layup 120. For example, in some embodiments, the furnace may be configured to heat the insulated layup 120 in a vacuum within the range of about 0.01 torr to about 2 torr, preferably within the range of about 0.1 torr to about 1 torr.

Additionally, in some embodiments, some original CMC components 100 may be alloyed CMCs, where Si alloys with boron present in the matrix within a SiC/SiC composite during melt infiltration of the original CMC component 100 (i.e., before the addition of the new material 102). The melting point of the alloyed Si is slightly lower than the melting point of a non-alloyed Si. As a result, if pure silicon (Si) is used as the infiltrating material during melt infiltration of the insulated layup 120 (where the new "dry" CMC material 102 positioned against the original CMC component 100 is infiltrated with silicon to form the final component 122), the silicon in the original alloyed CMC component 100 begins to melt at a lower temperature (1385° C.) than the melting temperature of the silicon infiltrating material (1414° C.). If the original CMC component 100 begins to melt before the silicon infiltrating material, the new dry material 102 may pull silicon out of the original CMC component 100, which can create porosity in the original CMC component 100.

Further, as described herein, applying the insulating material 118 around the original component 100, insulates the original material such that its temperature lags compared to the temperature of the new material as the parts 100, 102 are heated. Insulating the original alloyed CMC component 100 with the insulating material 118 also ensures the insulated original component 100 is above the melting point of silicon for less time than the new material 102, resulting in a lower probability of silicon loss from the original component 100 to the new material 102.

It will be appreciated that, with respect to FIGS. 2-5, different portions, segments, or layers are shown for exemplary illustrative purposes and are not to scale. Any suitable composite component may be represented by the forms illustrated in FIGS. 2-5, including a gas turbine engine component such as a blade, a vane, a nozzle, a shroud, a combustor liner, or a center frame, or another component. For example, the gas turbine engine component may be a vane 68, a blade 70, a vane 72, or a blade 74, as described with respect to FIG. 1. Any of the foregoing components may be assembled into and rendered part of a gas turbine engine, such as turbofan engine 10 shown in FIG. 1, in accordance with the present subject matter. Further, it will be understood that the gas turbine engine component comprises an original composite component 100 and a new composite material segment 102 joined to the original composite component 100 through the transfer of silicon between the original composite component 100 and the new composite material segment 102, and that the gas turbine engine component has minimal porosity.

Figure 6:
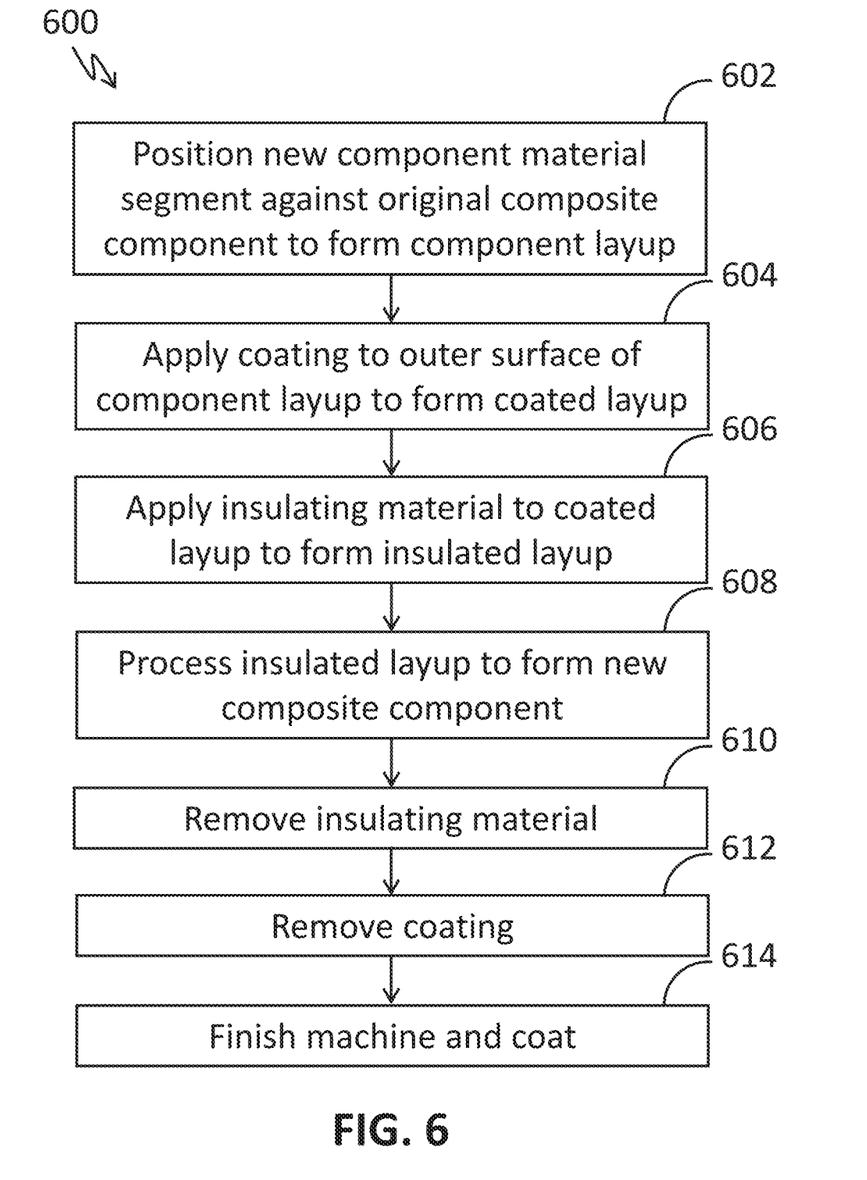
FIG. 6 provides a flow diagram of a method for adding a composite material to a composite component, according to an exemplary embodiment of the present subject matter.

Turning now to FIG. 6, a flow diagram is provided that illustrates an exemplary method 600 for adding a composite material to a composite component. As shown at 602 in FIG. 6, the method comprises positioning a composite material segment 102 against a composite component 100 to form a component layup 110. As described herein, the composite material segment 102 is a segment of new composite material such as one or more plies 102a, 102b, 102c, 102d, etc. or a composite preform, and the composite component 100 is an existing, completely formed part that, e.g., may be a blade, vane, combustion liner, etc. of a gas turbine engine such as turbofan engine 10. For instance, the composite component 100 may be a stator vane 68 or rotor blade 70 of a HP turbine 28 of the engine 10, or a stator vane 72 or rotor blade 74 of a LP turbine 30 of the engine 10. Further, as described herein, the composite component 100 may be in need of repair or refurbishment such that the composite material segment 102 is positioned at a damaged area 104 of the component 100. In some embodiments in which the method 600 is used to repair the component 100, the method also comprises preparing the damaged area 104 prior to positioning the new composite material segment 102 against the composite component 100. In other embodiments, the damaged area 104 may not require preparation for new material 102, such that the method 600 does not include preparing a damaged area 104 prior to positioning new material 102 against the component 100. The new material 102 need not be positioned at a damaged area 104; for example, in still other embodiments, the method 600 may be used to strengthen, enlarge, or otherwise modify the composite component 100 such that the new material 102 on or against the original component 100 at an area that is not damaged.

As shown at 604 and 606, the method 600 comprises applying a coating 112 to one or more regions 115 of an outer surface 114 of the component layup 110 to form a coated layup 116 and then applying an insulating material 118 around one or more portions 119 of the coated layup 116 to form an insulated layup 120. As previously described, the coating 112 may be a non-organic parting agent capable of withstanding a temperature of at least 1000° C. that limits bonding of the insulating material 118 or its constituents (such as silicon) to the region(s) 115 of the component layup 110. The region(s) 115 at which the coating 112 is applied may be regions of the component layup 110 that are sensitive to buildup of extraneous or excess material, e.g., excess matrix material such as silicon. For instance, machined features, areas defining critical dimensions, regions where extraneous material would be hard to remove, etc. may be sensitive regions 115 where applying the coating 112 may be desirable. Such sensitive regions 115 may be on or defined by the original composite component 100, the new composite material segment 102, or both. The coating 112 prevents or impedes the extraneous material, e.g., from the insulating material 118, from adhering to or being drawn into the layup 110. Moreover, in some embodiments, the coating 112 may be omitted, e.g., in embodiments where the component layup 110 lacks regions 115 that are sensitive to buildup of extraneous material, and, thus, step 604 of method 600 is omitted. In such embodiments, the insulating material 118 is applied around portions 119 of the component layup 110 rather than the coated layup 116. Additionally, in some embodiments, applying the insulating material 118 around one or more portions 119 includes applying the insulating material 118 around the entire layup 110 or entire layup 116.

As further described herein, the insulating material 118 forms a pack or shell about one or more portions 119 of the coated layup 116 or component layup 110 to create an environment 124 about the layup for generating a structurally significant bond between the original composite component 100 and the new composite material 102 without significant porosity in the resultant composite component 122. In embodiments in which the composite component 100 and composite material segment 102 are formed from a CMC material, the insulating material 118 may comprise silicon, boron nitride, silicon carbide, silicon nitride, boron carbide, boron, carbon (e.g., carbon powder, carbon fiber, and carbon felt) or another material, or combinations thereof. The insulating material 118 may be totally nonporous so as to form a complete barrier between silicon of the CMC component layup 110 or coated layup 116 and the ambient environment 124 during subsequent processing, particularly during densification. A small amount of wicking of silicon from the original CMC component 100 into the newly formed CMC material segment 102 forms a structurally significant bond between the original CMC component 100 and the new CMC material segment 102. The insulating material 118 prevents, minimizes, or reduces the overall loss of silicon from the original CMC component 100 due to volatilization during subsequent processing, such as during melt infiltration (MI) processing.

After the insulating material 118 is applied around the one or more portions 119 of the coated layup 116 or the component layup 110, the insulated layup 120 is processed to form the new, modified composite component 122, as depicted at 608 in FIG. 6. Processing the insulated layup 120 may include heating (or firing) the layup 120 in a vacuum or inert atmosphere and densifying the layup 120. In an exemplary embodiment, the composite material is a CMC, and processing the insulated CMC layup 120 includes heating the layup 120 to decompose the binders, remove the solvents, and convert the precursor to the desired ceramic matrix material. Due to decomposition of the binders, after heating the layup 120 is a porous CMC fired body that undergoes densification, e.g., melt infiltration (MI), to fill the porosity and yield the new CMC component 122.

Specific processing techniques and parameters will depend on the particular composition of the materials. For example, silicon comprising CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by a tool during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Referring to 610 and 612 in FIG. 6, the method 600 includes removing the insulating material 118 after processing the insulated layup 120, then removing the coating 112 after removing the insulating material 118. In some embodiments, the insulating material 118 may be removed by blasting off the insulating material 118 with a grit media, and the coating 112 may be washed off. Other means for removing the insulating material 118 and the coating 112 also may be used, and particular removal means may be selected based on the composition of the insulating material 118 and the coating 112, respectively. For example, one or more mechanical or chemical removal processes, such as grit blasting, water jet, ultrasonic cleaning, mild abrasive scrubbing, machining, hand scrubbing, wet etching, oxidation, or atmospheric (e.g., volatilization in another reactive atmosphere) processes, may be used to remove the insulating material 118 and/or the coating 112. Optionally, as shown at 614 in FIG. 6, after removing the insulating material 118 and coating 112, the composite component 122 may be finish machined, if and as needed, and coated with one or more protective coatings, such as an environmental barrier coating (EBC). Moreover, the method 600 described above is provided by way of example only. As an example, other known methods or techniques for densifying a composite component may be utilized. Alternatively, any combinations of these or other known processes may be used. Further, although in the exemplary embodiments described herein the composite material is a CMC, the composite material may be any composite material that is densified in a relatively high temperature environment. Additionally, as described herein, the composite component 100 may be a gas turbine engine component, such as but not limited to a blade, a vane, a nozzle, a shroud, a combustor liner, or a center frame. In accordance with the present subject matter, a gas turbine engine, such as engine 10, may include such a gas turbine engine component.

In some embodiments, the composite component 100 may be a component in need of repair. In such embodiments, the method 600, including coating at least one region 115 of the original component 100 and/or new material segment 102 with coating 112 and placing the insulating material 118 around at least a portion 119 of the coated layup 116, is performed during repair of the component 100. For instance, the composite component 100 may have been damaged during use, such as by the wearing away or breakage of a portion or portions or by formation of cracks or fissures. As described above, in some embodiments of repairing the component 100, the coating 112 may be omitted, such that the method 600 performed during repair of the component 100 includes placing the insulating material around at least a portion 119 of the component layup 110 formed by the component 100 and new material segment 102. Further, it will be appreciated that the method 600 is a process involving addition of a second, new composite segment to a first, original composite part or component, i.e., modifying the first, original composite component 100 by adding the second, new composite material segment 102 either to restructure, repair, rebuild, densify, strengthen, enlarge, or otherwise modify the original component 100.

Accordingly, as described herein, methods for modifying composite components by adding new composite material include applying an insulating material around at least a portion of the original composite component, with the new material segment positioned against the original component, prior to processing the original component and new material segment. During heating of the composites in processing, the insulating material prevents or minimizes loss of the constituents of the original composite component, as well as the formation of porosity within the new, modified composite component, while promoting a structurally significant bond between the original composite component and the new composite material segment. A coating may be applied to one or more regions of the original composite component and the new material segment to prevent or reduce bonding of the insulating material or any of its constituents to the composites. Other advantages of the subject matter described herein also may be realized by those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for adding a composite material to a previously densified composite component, the method comprising:
    positioning a composite material segment against the previously densified composite component to form a component layup;
    temporarily applying, without bonding, a silicon-based insulating material against at least a portion of previously densified outer surfaces of the component layup to form an insulated layup,
    wherein the silicon-based insulating material comprises, by dry weight, ≥25% and ≤95% silicon and >0% and <50% boron nitride;
    densifying the insulated layup; and
    removing the silicon-based insulating material after densifying the insulated layup.

2. The method of claim 1, wherein positioning the composite material segment against the previously densified composite component comprises positioning a plurality of composite material plies against the previously densified composite component, the plurality of composite material plies and the previously densified composite component forming the component layup.

3. The method of claim 2, wherein each composite material ply of the plurality of composite material plies comprises fibers extending generally along a longitudinal direction $L_1$ defined by the composite material ply,
    wherein a first composite material ply of the plurality of composite material plies is positioned against the previously densified composite component and a remainder of the plurality of composite material plies are stacked against the first composite material ply, and
    wherein an orientation of the plurality of composite material plies is varied such that the fibers of at least one ply of the plurality of composite material plies are oriented in a different direction with respect to a longitudinal direction $L_2$ defined by the previously densified composite component.

4. The method of claim 1, wherein densifying the insulated layup includes melt infiltrating the insulated layup.

5. The method of claim 1, wherein, when the insulated layup is densified, a locally high silicon vapor pressure is created at the previously densified composite component.

6. The method of claim 1, further comprising:
    preparing a damaged area for repair prior to positioning the composite material segment against the previously densified composite component,
    wherein positioning the composite material segment against the previously densified composite component comprises positioning the composite material segment at the damaged area.

7. The method of claim 1, further comprising:
    selectively applying a coating to a region of the previously densified outer surfaces of the component layup prior to applying the silicon-based insulating material, and leaving one or more portions of the previously densified outer surfaces uncoated.

8. The method of claim 7, wherein the coating is a non-organic parting agent capable of withstanding a temperature of at least 1000° C.

9. The method of claim 8, wherein the coating is boron nitride.

10. The method of claim 1, wherein the silicon-based insulating material further comprises, by dry weight, >0% and ≤10% boron carbide, and/or >0% and ≤20% organic binder.

11. A method for adding ceramic matrix composite (CMC) plies to a previously densified CMC component, the method comprising:
- positioning a plurality of CMC plies against the previously densified CMC component to form a component layup;
- applying a coating to a region of outer surfaces of the previously densified CMC component of the component layup to form a coated layup;
- temporarily applying, without bonding, a silicon-based insulating material against at least a portion of the previously densified outer surfaces of the coated layup outside of the coating to form an insulated layup,
- wherein the silicon-based insulating material comprises, by dry weight, ≥25% and ≤95% silicon and >0% and ≤50% boron nitride;
- densifying the insulated layup; and
- removing the silicon-based insulating material after densifying the insulated layup.

12. The method of claim 11, wherein each CMC ply of the plurality of CMC plies comprises fibers extending generally along a longitudinal direction $L_1$ defined by the CMC ply, wherein a first CMC ply of the plurality of CMC plies is positioned against the CMC component and a remainder of the plurality of CMC plies are stacked against the first CMC ply, and wherein an orientation of the plurality of CMC plies is varied such that the fibers of at least one ply of the plurality of CMC plies are oriented in a different direction with respect to a longitudinal direction $L_2$ defined by the CMC component.

13. The method of claim 12, further comprising:
- preparing a damaged area for repair prior to positioning the plurality of CMC plies against the CMC component,
- wherein positioning the plurality of CMC plies against the CMC component comprises positioning the plurality of CMC plies at the damaged area.

14. The method of claim 11, wherein densifying the insulated layup includes melt infiltrating the insulated layup.

15. The method of claim 11, wherein, when the insulated layup is densified, a locally high silicon vapor pressure is created at the CMC component.

16. A method for adding a composite material to a previously densified composite component, the method comprising:
- positioning a composite material segment against the previously densified composite component to form a component layup;
- temporarily applying, without bonding, a silicon-based insulating material around at least a portion of the component layup to form an insulated layup,
- wherein the silicon-based insulating material comprises, by dry weight, 25-95% silicon and >0% and ≤50% boron nitride;
- densifying the insulated layup; and
- removing the silicon-based insulating material after densifying the insulated layup.

17. The method of claim 11, wherein the silicon-based insulating material comprises, by dry weight, >0% and ≤10% boron carbide, and/or >0% and ≤20% organic binder.

18. The method of claim 16, wherein the silicon-based insulating material comprises, by dry weight, >0% and ≤10% boron carbide and/or >0% and ≤20% organic binder.

* * * * *